United States Patent
Nagashima et al.

(10) Patent No.: US 7,632,767 B2
(45) Date of Patent: Dec. 15, 2009

(54) INFRARED ABSORBENT GREEN GLASS COMPOSITION AND LAMINATED GLASS INCLUDING THE SAME

(75) Inventors: Yukihito Nagashima, Tokyo (JP); Harunori Murakami, Tokyo (JP)

(73) Assignee: Nippon Sheet Glass Company, Limited, Tokyo (JP)

( * ) Notice: Subject to any disclaimer, the term of this patent is extended or adjusted under 35 U.S.C. 154(b) by 549 days.

(21) Appl. No.: 11/375,996

(22) Filed: Mar. 15, 2006

(65) Prior Publication Data

US 2006/0217257 A1 Sep. 28, 2006

(30) Foreign Application Priority Data

Mar. 22, 2005 (JP) ............... 2005-081238

(51) Int. Cl.
*C03C 3/087* (2006.01)
*C03C 3/095* (2006.01)

(52) U.S. Cl. .................. 501/70; 501/64; 428/426
(58) Field of Classification Search .................. 501/64, 501/70, 71; 428/426
See application file for complete search history.

(56) References Cited

U.S. PATENT DOCUMENTS

| | | | |
|---|---|---|---|
| 2,860,059 A | 11/1958 | Molter et al. | |
| 4,792,536 A | 12/1988 | Pecoraro et al. | |
| 5,320,986 A * | 6/1994 | Taniguchi et al. | 501/70 |
| 5,362,689 A * | 11/1994 | Morimoto et al. | 501/70 |
| 5,385,872 A * | 1/1995 | Gulotta et al. | 501/71 |
| 5,776,845 A * | 7/1998 | Boulos et al. | 501/70 |
| 5,830,568 A | 11/1998 | Kondo | |
| 5,830,814 A | 11/1998 | Combes | |
| 5,858,896 A * | 1/1999 | Nagashima et al. | 501/66 |
| 5,897,956 A * | 4/1999 | Kijima et al. | 428/426 |
| 5,998,316 A * | 12/1999 | Seto et al. | 501/71 |
| 6,340,646 B1 | 1/2002 | Nagashima et al. | |
| 6,468,934 B2 * | 10/2002 | Nagashima et al. | 501/64 |
| 6,524,685 B1 | 2/2003 | Torr et al. | |
| 6,551,953 B1 * | 4/2003 | Gulotta et al. | 501/70 |
| 6,624,102 B2 * | 9/2003 | Seto et al. | 501/71 |
| 6,753,280 B2 * | 6/2004 | Seto et al. | 501/70 |
| 6,784,129 B2 * | 8/2004 | Seto et al. | 501/71 |
| 6,858,553 B2 * | 2/2005 | Seto et al. | 501/70 |
| 7,094,716 B2 * | 8/2006 | Boulos et al. | 501/70 |
| 2001/0018393 A1 * | 8/2001 | Nagashima et al. | 501/64 |
| 2002/0058579 A1 * | 5/2002 | Seto et al. | 501/71 |
| 2002/0068678 A1 * | 6/2002 | Seto et al. | 501/70 |
| 2003/0050175 A1 * | 3/2003 | Seto et al. | 501/71 |
| 2003/0083188 A1 * | 5/2003 | Seto et al. | 501/71 |
| 2004/0067836 A1 * | 4/2004 | Boulos et al. | 501/70 |
| 2008/0026211 A1 * | 1/2008 | Nagashima et al. | 428/339 |

FOREIGN PATENT DOCUMENTS

| | | |
|---|---|---|
| EP | 0 488 110 | 6/1992 |
| EP | 1 195 359 | 4/2002 |
| JP | 60-215546 | 10/1985 |
| JP | 64-18938 | 1/1989 |
| JP | 3-187946 | 8/1991 |
| JP | 4-187539 | 7/1992 |
| JP | 8-500811 | 1/1996 |
| JP | 8-259279 | 10/1996 |
| JP | 2003-119048 | 4/2003 |
| WO | 91/07356 | 5/1991 |
| WO | 99/25660 | 5/1999 |
| WO | 2005/063643 | 7/2005 |

OTHER PUBLICATIONS

EP Search Report Dated Jun. 13, 2006.

* cited by examiner

*Primary Examiner*—Karl E Group
*Assistant Examiner*—Elizabeth A Bolden
(74) *Attorney, Agent, or Firm*—Hamre, Schumann, Mueller & Larson, P.C.

(57) ABSTRACT

A glass composition that has improved infrared absorptivity while preventing the visible light transmittance from decreasing excessively. The glass composition includes: the following components, expressed in mass %: $65 < SiO_2 \leq 75$; $0 \leq B_2O_3 \leq 5$; $0 \leq Al_2O_3 \leq 5$; $0 \leq MgO < 2$; $10 < CaO \leq 15$; $0 \leq SrO \leq 10$; $0 \leq BaO \leq 10$; $0 \leq Li_2O \leq 5$; $10 \leq Na_2O \leq 15$; $0 \leq K_2O \leq 5$; and $0 \leq TiO_2 \leq 0.5$, where $10 < MgO+CaO+SrO+BaO \leq 20$ and $10 \leq Na_2O+K_2O \leq 17.5$; MnO 0 to 300 mass ppm; and the following components as colorants, expressed in mass %: $0.4 \leq T-Fe_2O_3 \leq 1.0$, where $T-Fe_2O_3$ is total iron oxide expressed as $Fe_2O_3$; and $0 \leq CeO_2 \leq 2.0$. The mass ratio of FeO expressed as $Fe_2O_3$ to $T-Fe_2O_3$ is 20 to 44%. The wavelength at which a minimum transmittance is obtained in a range of 550 to 1700 nm is at least 1065 nm. The transmittance that is obtained at a wavelength of 1650 nm is not higher than the transmittance that is obtained at a wavelength of 730 nm.

16 Claims, 2 Drawing Sheets

INFRARED ABSORBENT GREEN GLASS COMPOSITION AND LAMINATED GLASS INCLUDING THE SAME

BACKGROUND OF THE INVENTION

1. Field of the Invention

The present invention relates generally to an infrared absorbent green glass composition that is excellent in infrared absorptivity and has a high visible light transmittance, and to laminated glass including the same.

2. Related Background Art

Many of the glass sheets to be used for vehicles and buildings are manufactured by a float process. The base glass composition thereof is so called soda-lime-silica glass. Usually, these glass sheets are installed in the windows of vehicles or buildings. From a viewpoint of energy saving, there is demand for the infrared absorbent glass sheets that have excellent infrared absorptivity. With respect to the glass sheets that are used for vehicles such as automobiles, depending on the special locations where they are to be disposed, the lower limit of visible light transmittance has been specified to ensure visibility and therefore an infrared absorbent glass sheet that has a high visible light transmittance is desired. For example, in Japan, the visible light transmittance of windshield glass of automobiles is specified to be at least 70%.

In order to improve the infrared absorptivity of soda-lime-silica glass, many techniques of utilizing the absorption by divalent iron (FeO) have been proposed (see, for instance, JP1(1989)-18938A (Reference 1), JP3(1991)-187946A (Reference 2), etc.). The iron oxides that are contained in a glass composition include FeO, which corresponds to divalent iron. The FeO intensively absorbs lights with wavelengths in the range of 550 to 1600 nm. Accordingly, when FeO is present, a glass composition can be obtained that has improved infrared absorptivity. Generally, the peak of the infrared absorption by FeO is about 1050 nm.

Reference 1 discloses, as Composition No. 4 in Table 1, a glass composition having the following composition and transmittance: COMPOSITION: expressed in mass %, $SiO_2$ 71.56%, $Na_2O$ 14.19%, $K_2O$ 0.05%, CaO 12.85%, MgO 0.16%, $Al_2O_3$ 0.25%, $SO_3$ 0.17%, total iron expressed as $Fe_2O_3$ 0.606%, FeO expressed as $Fe_2O_3$ 0.270%, and the ratio of FeO expressed as $Fe_2O_3$ to the total iron 0.446; and TRANSMITTANCE (at a thickness of 5 mm): light transmittance ($LT_A$) 68.8%, total solar infrared transmittance (TSIR) 10.8%, total solar energy transmittance (TSET) 37.7%, and total solar ultraviolet transmittance (TSUV) 43.8%.

Reference 2 discloses infrared and ultraviolet absorbent soda-lime-silica glass that contains approximately 0.51 to 0.96 wt % of $Fe_2O_3$, approximately 0.15 to 0.33 wt % of FeO, and approximately 0.2 to 1.4 wt % of $CeO_2$ as main components.

In order further to advance the energy saving such as, for example, reduction in electric energy that is required for air-conditioning etc., it is effective to reduce "the feeling of heat" that human beings sense on their skin due to the sunlight that passes through a glass sheet to enter a car or a room. The reduction of the feeling of heat can be achieved by increasing the absorption of lights with wavelengths of 1100 nm and longer. Generally, the absorption can be increased by increasing the content of FeO in a glass composition. However, simply increasing the content of FeO causes an increase in absorption in the visible light range at the same time. Accordingly, even if the feeling of heat can be reduced, the uses of the glass composition are limited.

Hence, attempts have been made to improve the infrared absorptivity of a glass composition by shifting the absorption range of FeO to the longer wavelength side without reducing visible light transmittance excessively.

For instance, JP4(1992)-187539A (Reference 3) discloses a glass composition that forms potash-lime-silica glass and thereby allows the absorption range of FeO contained therein to shift to the longer wavelength side. The potash-lime-silica glass, however, has a problem of high raw material cost.

JP60(1985)-215546A (Reference 4) discloses a glass composition that have infrared absorptivity improved by using BaO that can shift the absorption range of FeO to the longer wavelength side, with the visible light transmittance being kept high.

JP8(1996)-500811A (WO94/14716A1; Reference 5) discloses a glass composition containing $Fe_2O_3$ and FeO. Reference 5 describes that "the presence of $K_2O$ can increase the infrared absorption of glass under given conditions" and "alkaline-earth oxides have a decisive effect in obtaining the characteristics of the glass according to the present invention. As a fact, limiting the ratio of MgO to 2% or lower, preferably omitting it in the intended additive form in the glass of the present invention makes it possible to improve the infrared absorptivity". In the glass composition disclosed in Reference 5, the content of CaO that is an alkaline-earth oxide is 10 wt % or less.

Apart from these glass compositions, the present applicants have disclosed an ultraviolet/infrared absorbent glass that contains 5 to 15 wt % CaO as well as iron oxide and $CeO_2$ as colorants, in WO99/25660A1 (Reference 6). Reference 6 describes that "CaO improves the durability of glass and is used for adjusting the viscosity and devitrification temperature in the glass forming process" and "it is necessary that total iron oxide (T—$Fe_2O_3$) expressed as $Fe_2O_3$ is 0.35 to 0.55%, FeO is 0.08 to 0.15%, and the ratio of FeO (expressed as $Fe_2O_3$)/T—$Fe_2O_3$ is in the range of at least 0.20 but lower than 0.27".

Furthermore, the present applicants also have disclosed a glass composition that contains 5 to 15 wt % CaO as well as iron oxide and $CeO_2$ as colorants, in JP2003-119048A (Reference 7). Reference 7 describes that "when the glass composition of the present invention has both higher visible light transmittance and lower infrared transmittance, it is preferable that it contain 0.4 to 1% of T—$Fe_2O_3$ and 0.01 to 0.40% of $TiO_2$. This makes it possible to obtain glass with a visible light transmittance of at least 70% that is measured using the illuminant A, with the glass thickness being 1 to 6 mm" (Paragraph No. 0043).

On the other hand, JP8(1996)-259279A (Reference 8) discloses a technique of securing thermal insulation and transparency of laminated glass not by controlling the glass composition but instead by dispersing functional fine particles such as ITO (indium-tin oxide) in an interlayer film of the laminated glass. For instance, the laminated glass described in Example 3 of Reference 8 has a configuration in which ITO fine particles with diameters of 0.1 μm or smaller are dispersed in an interlayer thereof, and has a visible light transmittance $T_V$ of 76.3% and a solar radiation transmittance $T_S$ of 51.5%. However, since the functional fine particles of, for instance, ITO are expensive, the cost for manufacturing the laminated glass disclosed in Reference 8 is high. In addition, it is difficult to apply the technique disclosed in Reference 8 to a single glass sheet.

SUMMARY OF THE INVENTION

Hence, the present invention is intended to provide an infrared absorbent green glass composition that is excellent in practicability and has improved infrared absorptivity while preventing the visible light transmittance from decreasing excessively by employing a different configuration from those of the conventional glass compositions and laminated glasses described above. The present invention also is intended to provide laminated glass including the above-mentioned infrared absorbent green glass composition.

The infrared absorbent green glass composition of the present invention includes:

the following components, expressed in mass %: $65 < SiO_2 \leq 75$; $0 \leq B_2O_3 \leq 5$; $0 \leq Al_2O_3 \leq 5$; $0 \leq MgO < 2$; $10 < CaO \leq 15$; $0 \leq SrO \leq 10$; $0 \leq BaO \leq 10$; $0 \leq Li_2O \leq 5$; $10 \leq Na_2O \leq 15$; $0 \leq K_2O \leq 5$; and $0 \leq TiO_2 \leq 0.5$, where $10 < MgO + CaO + SrO + BaO \leq 20$ and $10 \leq Na_2O + K_2O \leq 17.5$;

the following component, expressed in mass ppm: MnO 0 to 300 ppm; and the following components as colorants, expressed in mass %: $0.4 \leq T-Fe_2O_3 \leq 1.0$, where $T-Fe_2O_3$ is total iron oxide expressed as $Fe_2O_3$; and $0 \leq CeO_2 \leq 2.0$. The mass ratio of FeO expressed as $Fe_2O_3$ to $T-Fe_2O_3$ (the FeO ratio: $FeO/T-Fe_2O_3$) is 20 to 44%.

In the glass composition of the present invention, the wavelength $T_{min}$ at which a minimum transmittance is obtained in the range of 550 to 1700 nm is at least 1065 nm, while the transmittance $T_{1650}$ that is obtained at a wavelength of 1650 nm is not higher than the transmittance $T_{730}$ that is obtained at a wavelength of 730 nm.

In the glass composition of the present invention, the basicity of glass is increased as compared to the conventional cases and thereby the wavelength of light that is absorbed by FeO, which is a colorant, is shifted to the longer wavelength side. The basicity of glass can be increased by increasing the content of an alkaline-earth oxide component whose ionic radius is relatively large, for example. In the glass composition of this invention, attention was focused on MgO and CaO, and a part or the whole of MgO is replaced by CaO. The part of CaO further may be replaced by SrO or BaO as required. Specifically, while the content of MgO is 0 mass % or more but less than 2 mass %, the content of CaO, whose ionic radius is larger than that of MgO, exceeds 10 mass % but is 15 mass % or less.

Such a glass composition makes it possible to improve the infrared absorptivity while preventing the visible light transmittance from decreasing excessively. For example, it is possible to reduce the feeling of heat that human beings sense on their skin due to the sunlight that has passed through a glass sheet formed of the above-mentioned glass composition.

In the glass composition of the present invention, in order to increase the basicity of glass, the content of an alkali oxide component whose ionic radius is relatively large also can be increased. Specifically, a part of $Na_2O$ can be replaced by $K_2O$ within the range of the above-mentioned composition.

The glass composition of the present invention may include $CeO_2$ as a colorant within the range of the above-mentioned composition. In this case, a glass composition can be obtained that has further improved ultraviolet absorptivity.

DETAILED DESCRIPTION OF THE INVENTION

Figure 1:
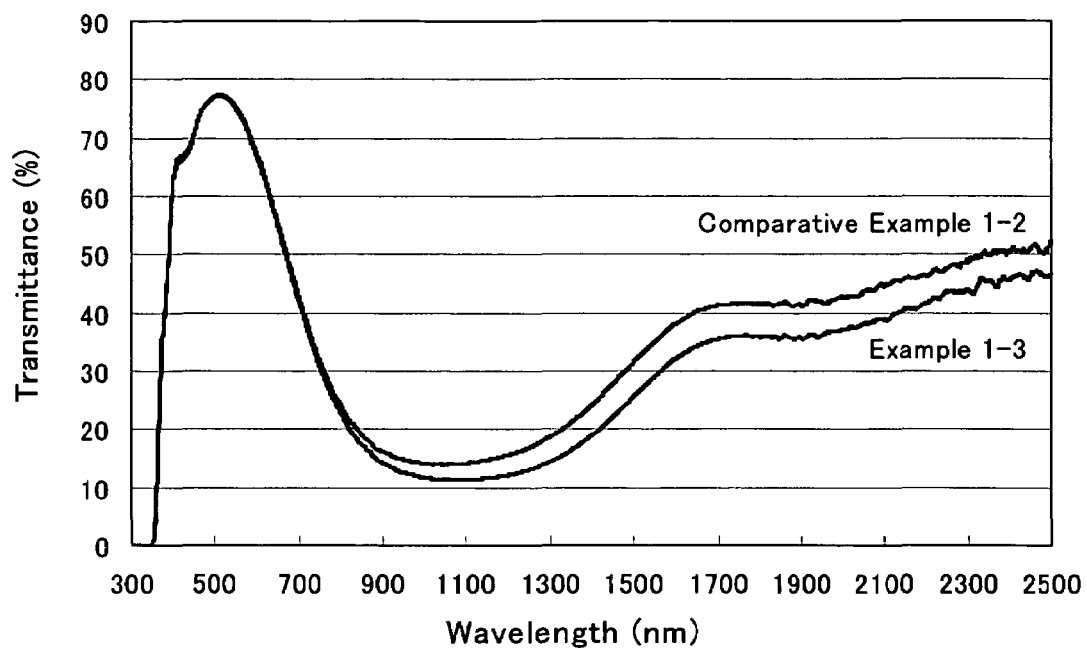
FIG. 1 is a graph showing the spectral transmittance curves of Example Sample 1-3 and Comparative Example Sample 1-2 that were measured in Examples.

Both the units "%" and "ppm" that are used for indicating the contents of components are based on mass.

The reasons for limiting the composition of the glass composition according to the present invention are described below.

$SiO_2$ $SiO_2$ is a main component forming a skeleton of glass. When the content of $SiO_2$ is 65% or less, the glass has deteriorated durability. On the other hand, the content of $SiO_2$ exceeding 75% results in difficulty in melting the glass. Preferably, the content of $SiO_2$ is $66.5 \leq SiO_2 < 69$.

$B_2O_3$ $B_2O_3$ is not an essential component but a component that is used for improving the durability of glass or as a melting aid. $B_2O_3$ also has an effect of enhancing ultraviolet absorption. When the content of $B_2O_3$ exceeds 5%, the effect of decreasing the transmittance extends from the ultraviolet region to the visible region. This causes the glass to tend to assume a yellowish transmission color tone. Furthermore, it also causes a problem in the glass forming process due to, for example, volatilization of $B_2O_3$. Accordingly, the upper limit of $B_2O_3$ content is 5%. The content of $B_2O_3$ is preferably in the range of 0 to less than 2%.

$Al_2O_3$ $Al_2O_3$ is not an essential component but a component that improves the durability of glass. When the content of $Al_2O_3$ exceeds 5%, the glass tends to be difficult to melt. Furthermore, an excessively large content of $Al_2O_3$ decreases the average linear expansion coefficient of glass and thereby impairs the strengthening effect. Accordingly, it is preferable that the content thereof be 2.5% or less.

MgO

MgO is not an essential component but is a component that improves the durability of glass and is used for adjusting the devitrification temperature and viscosity in the glass forming process. The glass composition of the present invention may contain less than 2% of MgO. In order to improve the basicity of glass, however, it is preferable that MgO be omitted to the greatest possible extent. Specifically, the content of MgO is preferably 1.5% or less, more preferably 0.75% or less, and further preferably 0.5% or less.

CaO

CaO is an essential component that is used for improving the basicity of glass. CaO also improves the durability of glass while being used for adjusting the devitrification temperature and viscosity in the glass forming process. When the content of CaO is 10% or less, the effect of improving the basicity of glass is poor. On the other hand, CaO content exceeding 15% results in an increase in the devitrification temperature. The content of CaO therefore is preferably at least 11%, more preferably at least 12%.

CaO/MgO

In the glass composition of the present invention, in order to improve the basicity of glass satisfactorily, the mass ratio of CaO to MgO (CaO/MgO) is preferably at least 7.5. This mass ratio is more preferably at least 10 and further preferably at least 30. The upper limit of this mass ratio is not particularly limited but can be 80.

SrO And BaO

SrO and BaO are not essential components but may be added to improve the basicity of glass and to not only improve the durability of glass but also adjust the devitrification temperature and viscosity in the glass forming process. Since SrO and BaO are expensive materials, it is not preferable that their contents each exceed 10%.

MgO+CaO+SrO+BaO

When the total content of alkaline-earth oxides (MgO+ CaO+SrO+BaO) is 10% or less, the required amount of CaO cannot be present. Furthermore, since it is necessary to increase the content of the alkali oxides to maintain the devitrification temperature and viscosity in the glass forming process, the durability of the glass deteriorates. On the other hand, the total exceeding 20% results in an increase in devitrification temperature and an increase in glass density, which cause difficulty in manufacturing the glass. It therefore is preferable that the total be less than 15%.

$Li_2O$, $Na_2O$, and $K_2O$ $Li_2O$, $Na_2O$, and $K_2O$ are alkali oxides and are components that are used as accelerators for melting glass. When the content of $Na_2O$ is less than 10% or when the total of the contents of $Na_2O$ and $K_2O$ is less than 10%, the melting acceleration effect is poor. On the other hand, when the content of $Na_2O$ exceeds 15% or when the total of the contents of $Na_2O$ and $K_2O$ exceeds 17.5%, the durability of the glass deteriorates.

Preferably, the content of $Na_2O$ is $10 \leqq Na_2O < 14.5$. In this case, the total of the contents of $Na_2O$ and $K_2O$ is $11.5 \leqq Na_2O + K_2O \leqq 15$.

As described above, in order to increase the basicity of glass, a part of $Na_2O$ may be replaced by $K_2O$. However, since $K_2O$ is an expensive material as compared to $Na_2O$, it is preferable that the content of $K_2O$ not exceed 5%.

Like $K_2O$, $Li_2O$ also is an expensive material as compared to $Na_2O$. It therefore is preferable that the content thereof not exceed 5%. Furthermore, in order to increase the basicity of glass, it is preferable that $Li_2O$ be not contained to the possible extent.

$TiO_2$

In order to decrease the devitrification temperature of glass, a small amount of $TiO_2$ may be added. $TiO_2$ also is a component that absorbs ultraviolet rays. When the content of $TiO_2$ increases, the glass tends to assume a yellowish tint. Accordingly, the upper limit thereof is 0.5%.

MnO

MnO is not an essential component but may be added in a small amount.

The glass composition of the present invention includes $Fe_2O_3$ and FeO and further may include $CeO_2$ at the same time. Hence, MnO is a component that is effective for adjusting the transmission color tone of glass and adjusting the FeO ratio. Accordingly, it is preferable that the glass composition of the present invention include MnO. However, when the content of MnO is excessively large, the influence of coloring (solarization) of MnO itself is exerted. The upper limit of MnO content therefore is 300 ppm. With respect to MnO, when the content thereof is at least approximately 50 ppm, MnO is considered as being "contained".

Iron Oxide

The glass composition of the present invention contains iron oxides as a colorant. The iron oxides are present in the form of $Fe_2O_3$ and FeO in glass. $Fe_2O_3$ absorbs ultraviolet rays, while FeO absorbs infrared rays.

The content of T—$Fe_2O_3$ that is obtained by expressing the total amount of $Fe_2O_3$ and FeO as $Fe_2O_3$ is selected from the range of 0.4 to 1.0%. The mass ratio of FeO expressed as $Fe_2O_3$ to T—$Fe_2O_3$ (the FeO ratio: FeO/T—$Fe_2O_3$) is selected from the range of 20 to 44%.

When the content of T—$Fe_2O_3$ is less than 0.4%, infrared and ultraviolet absorption effects cannot be obtained satisfactorily. On the other hand, when the content exceeds 1.0%, the radiant heat of flame is absorbed considerably by the upper surface portion of molten glass in melting glass raw materials and thereby it is difficult to satisfactorily heat glass that is located near the bottom part of the melting furnace in melting the glass, and in addition, the glass would have an excessively high specific gravity. It is preferable that the content of T—$Fe_2O_3$ exceed 0.65%.

When the FeO ratio is lower than 20%, the infrared absorption effect cannot be obtained satisfactorily. From this viewpoint, the FeO ratio is preferably at least 25%, more preferably at least 27%. On the other hand, an excessively high FeO ratio tends to cause silica-rich striae or silica scum. Accordingly, in the glass composition of the present invention, the FeO ratio is 44% or lower. It is preferable that this ratio be lower than 35%.

The content of T—$Fe_2O_3$ and the FeO ratio can be adjusted suitably according to, for example, the thickness of the glass sheet to be formed, with consideration given to other characteristics.

$CeO_2$ $CeO_2$ is not an essential component but is a component that is effective for ultraviolet absorption. In addition, it also is used for adjusting the transmission color tone of glass, as a colorant.

The content of $CeO_2$ is preferably at least 0.1%. On the other hand, when the content of $CeO_2$ exceeds 2.0%, the absorption of visible light on the lower wavelength side increases excessively and thereby desired visible light transmittance and transmission color tone cannot be obtained. From this viewpoint, the content of $CeO_2$ is preferably 1.5% or less, more preferably 1.0% or less.

Like iron oxides, the content of $CeO_2$ can be adjusted suitably according to, for example, the thickness of the glass sheet to be formed, with consideration given to other characteristics.

The glass composition of the present invention may include other trace components in addition to the respective components described above. Examples of the trace components include NiO, $Cr_2O_3$, $Mo_2O_3$, ZnO, $SnO_2$, and $La_2O_3$. The total amount of the trace components is 5% or less, preferably 2% or less. The preferred upper limit of the content of each trace component is 0.01% in the case of NiO, $Cr_2O_3$, and $Mo_2O_3$ and 1% in the case of ZnO, $SnO_2$, and $La_2O_3$.

The glass composition of the present invention makes it possible to provide glass with various solar control properties according to the uses of the glass and the places where the glass is used, by adjusting the whole composition, with iron oxide being contained and other components such as $CeO_2$ being allowed to be contained as required. The total solar energy transmittance and the visible light transmittance depend mainly on iron oxide. The ultraviolet transmittance depends mainly on iron oxide, $CeO_2$, and $TiO_2$. The amount of shift of the absorption range of FeO depends mainly on the basicity of glass. The specific contents of the respective components that are contained in the glass composition of the present invention can be adjusted suitably according to, for example, the thickness of the glass sheet to be formed, with consideration given to other characteristics.

According to the present invention, an infrared absorbent green glass composition A (an infrared absorbent green glass sheet A) can be obtained that is formed into a sheet shape with a thickness of at least 1.3 mm but less than 2.5 mm and that has a visible light transmittance ($Y_A$) of at least 80%, which is measured with the illuminant A, as well as a total solar energy transmittance ($T_G$) of 62% or lower, by adjusting the above-mentioned composition suitably.

According to the present invention, an infrared absorbent green glass composition B (an infrared absorbent green glass sheet B) can be obtained that is formed into a sheet shape with a thickness between 2.5 mm and 6 mm and that has a visible light transmittance ($Y_A$) of at least 70%, which is measured with the illuminant A, as well as a total solar energy transmittance ($T_G$) of 55% or lower and an ultraviolet transmittance ($T_{UV}$) of 15% or lower, by adjusting the above-mentioned composition suitably The above-mentioned infrared absorbent green glass sheets can be formed by a general method of manufacturing a glass sheet.

With glass sheets containing a glass composition according to the present invention, a laminated glass of the present invention can be formed. In the glass composition of the present invention, the wavelength $T_{min}$ at which the minimum transmittance is obtained in the range of 550 to 1700 nm is at least 1065 nm, while the transmittance $T_{1650}$ that is obtained at a wavelength of 1650 nm is not higher than the transmittance $T_{730}$ that is obtained at a wavelength of 730 nm. Furthermore, when the above-mentioned composition is adjusted suitably, the wavelength $T_{min}$ can be at least 1070 nm and in some cases, at least 1075 nm or approximately 1100 nm. Such a glass composition is suitable for a large glass sheet to be used for laminated glass for vehicles.

The laminated glass of the present invention includes at least two glass sheets that are bonded to each other, with a thermoplastic resin layer being interposed therebetween. At least one selected from the glass sheets is formed of an infrared absorbent green glass composition of the present invention. The at least two glass sheets that form the laminated glass may be made of an infrared absorbent green glass composition of the present invention.

Preferably, at least one selected from the above-mentioned glass sheets is formed of the above-mentioned infrared absorbent green glass composition A or the above-mentioned infrared absorbent green glass composition B. Such laminated glass is suitable as laminated glass for vehicles.

Preferably, the laminated glass of the present invention has a visible light transmittance ($Y_A$) of at least 70%, which is measured with the illuminant A, and a total solar energy transmittance ($T_G$) of 45% or lower.

The laminated glass of the present invention can be formed by a general method of manufacturing laminated glass.

EXAMPLES

Hereinafter, the present invention is described further in detail using examples. The present invention, however, is not limited by the following examples.

Silica sand, dolomite, limestone, soda ash, salt cake, potassium carbonate, carbon, iron oxide, titanium oxide, cerium oxide, and blast furnace slag were mixed together in such a manner that the compositions of the glass to be obtained were those shown in Tables 1 and 2. Thus batches were prepared. Next, each batch thus prepared was melted with an electric furnace at 1450° C., and the glass melt obtained thereby was poured onto a stainless steel plate. This was cooled gradually to room temperature. Thus a glass sheet was obtained. The glass sheet thus obtained was formed and polished to have predetermined size and thickness so as to be suitable for the measurements of various physical properties thereof.

Tables 1 and 2 indicate the physical property values that were measured with respect to each glass sheet. In the tables, the total of the contents may not be 100% in some cases. This is because of the difference in number of significant figures.

In Tables 1 and 2, $Y_A$ denotes a visible light transmittance measured with the illuminant A of the standard of International Commission on Illumination (CIE), $T_G$ indicates a total solar energy transmittance, and $T_{UV}$ denotes an ultraviolet transmittance. More specifically, $Y_A$ and $T_G$ are values measured in accordance with the regulation of JIS R3106:1998, while $T_{UV}$ is a value measured in accordance with the regulation of ISO 9050:2003. $T_{UV}$ was measured using the solar spectrum of air mass 2 reported by Parry Moon and the wavelength range over which the measurement was carried out was 300 to 400 nm.

In Tables 1 and 2, $T_{min}$ denotes the wavelength at which the minimum transmittance was obtained in the range of 550 to 1700 nm, $T_{730}$ indicates the transmittance obtained at a wavelength of 730 nm, and $T_{1650}$ indicates the transmittance obtained at a wavelength of 1650 nm. $T_{min}$, $T_{730}$, and $T1650$ were determined from the spectral transmittance curve (in the range of 200 to 2500 nm) measured with respect to each glass sheet. The spectral transmittance curve was determined using a commercial spectrophotometer.

TABLE 1

|  | Ex. 1-1 | Ex. 1-2 | Ex. 1-3 | Ex. 1-4 | Ex. 1-5 | Ex. 1-6 | Ex. 1-7 | Ex. 1-8 |
|---|---|---|---|---|---|---|---|---|
| $SiO_2$ | 69.5 | 69.2 | 69.2 | 68.7 | 69.5 | 69.2 | 68.7 | 69.1 |
| $Al_2O_3$ | 1.6 | 1.5 | 1.5 | 1.7 | 1.6 | 1.5 | 1.7 | 1.5 |
| $Na_2O$ | 14.1 | 14.2 | 14.2 | 12.3 | 14.2 | 14.2 | 12.3 | 12.3 |
| MgO | 0.4 | 0.4 | 0.4 | 0.4 | 0.4 | 0.4 | 0.4 | 0.4 |
| CaO | 12.0 | 12.5 | 12.4 | 12.3 | 12.1 | 12.5 | 12.3 | 12.0 |
| $K_2O$ | 0.5 | 0.5 | 0.5 | 3.0 | 0.5 | 0.5 | 3.0 | 3.0 |
| $TiO_2$ | 0.05 | 0.05 | 0.05 | 0.05 | 0.05 | 0.05 | 0.05 | 0.05 |
| T-$Fe_2O_3$ | 0.95 | 0.90 | 0.87 | 0.74 | 0.78 | 0.78 | 0.78 | 0.78 |
| $CeO_2$ | 0.88 | 0.88 | 0.88 | 0.88 | 0.88 | 0.88 | 0.88 | 0.88 |
| MnO (mass ppm) | 200 | 180 | 180 | 190 | 190 | 190 | 180 | 180 |

TABLE 1-continued

|  | Ex. 1-1 | Ex. 1-2 | Ex. 1-3 | Ex. 1-4 | Ex. 1-5 | Ex. 1-6 | Ex. 1-7 | Ex. 1-8 |
|---|---|---|---|---|---|---|---|---|
| CaO/MgO | 30.0 | 31.3 | 31.0 | 30.8 | 30.3 | 31.3 | 30.8 | 30.0 |
| FeO/T-Fe$_2$O$_3$ (%) | 27.9 | 27.6 | 27.8 | 27.8 | 29.7 | 34.9 | 31.3 | 31.3 |
| Sheet Thickness (mm) | 3.5 | 3.9 | 3.9 | 4.8 | 2.1 | 2.1 | 2.1 | 2.1 |
| Y$_A$ (%) | 72.4 | 71.6 | 72.3 | 71.9 | 81.5 | 80.4 | 81.4 | 81.4 |
| T$_G$ (%) | 43.2 | 42.0 | 42.2 | 42.0 | 60.6 | 57.4 | 59.6 | 60.2 |
| T$_{UV}$ (%) | 9.6 | 9.8 | 9.7 | 9.6 | — | — | — | — |
| T$_{min}$ (nm) | 1070 | 1075 | 1075 | 1100 | 1070 | 1075 | 1100 | 1100 |
| T$_{730}$ (%) | 40.0 | 38.5 | 39.0 | 38.7 | 61.2 | 56.9 | 60.0 | 60.0 |
| T$_{1650}$ (%) | 39.8 | 37.0 | 37.3 | 37.1 | 60.3 | 55.9 | 58.8 | 58.8 |

\* The contents of all the components other than MnO are indicated in mass %.
Y$_A$: visible light transmittance;
T$_G$: total solar energy transmittance;
T$_{UV}$: ultraviolet transmittance;
T$_{min}$: wavelength at which the minimum transmittance was obtained in the range of 550 to 1700 nm;
T$_{730}$: transmittance obtained at a wavelength of 730 nm; and
T$_{1650}$: transmittance obtained at a wavelength of 1650 nm
\* "Ex." denotes Example.

TABLE 2

|  | C. Ex. 1-1 | C. Ex. 1-2 | C. Ex. 1-3 | C. Ex. 1-4 | C. Ex. 1-5 | C. Ex. 1-6 |
|---|---|---|---|---|---|---|
| SiO$_2$ | 70.0 | 70.0 | 70.0 | 70.0 | 70.0 | 69.0 |
| Al$_2$O$_3$ | 1.5 | 1.5 | 1.5 | 1.5 | 1.5 | 2.4 |
| Na$_2$O | 14.2 | 14.3 | 14.3 | 14.3 | 14.3 | 15.2 |
| MgO | 3.2 | 3.2 | 3.3 | 3.2 | 3.2 | 1.6 |
| CaO | 8.8 | 8.7 | 8.8 | 8.8 | 8.8 | 9.2 |
| K$_2$O | 0.5 | 0.5 | 0.5 | 0.5 | 0.5 | 0.7 |
| TiO$_2$ | 0.05 | 0.05 | 0.05 | 0.05 | 0.05 | 0.03 |
| T-Fe$_2$O$_3$ | 0.90 | 0.85 | 0.70 | 0.78 | 0.78 | 0.78 |
| CeO$_2$ | 0.88 | 0.88 | 0.88 | 0.88 | 0.88 | 0.88 |
| MnO (mass ppm) | 170 | 200 | 200 | 180 | 200 | 200 |
| CaO/MgO | 2.8 | 2.7 | 2.7 | 2.8 | 2.8 | 5.8 |
| FeO/T-Fe$_2$O$_3$ (%) | 25.6 | 28.6 | 28.0 | 25.6 | 31.8 | 25.1 |
| Sheet Thickness (mm) | 3.5 | 3.9 | 4.8 | 2.1 | 2.1 | 4.0 |
| Y$_A$ (%) | 72.5 | 71.7 | 72.0 | 82.1 | 80.6 | 73.3 |
| T$_G$ (%) | 45.6 | 44.4 | 44.3 | 63.9 | 59.6 | 44.9 |
| T$_{UV}$ (%) | 8.9 | 8.3 | 8.1 | — | — | 9.3 |
| T$_{min}$ (nm) | 1050 | 1050 | 1050 | 1050 | 1050 | 1060 |
| T$_{730}$ (%) | 40.1 | 40.9 | 40.6 | 63.1 | 57.6 | 41.2 |
| T$_{1650}$ (%) | 48.5 | 42.1 | 41.7 | 66.4 | 61.0 | 43.5 |

\* The contents of all the components other than MnO are indicated in mass %.
Y$_A$: visible light transmittance;
T$_G$: total solar energy transmittance;
T$_{UV}$: ultraviolet transmittance;
T$_{min}$: wavelength at which the minimum transmittance was obtained in the range of 550 to 1700 nm;
T$_{730}$: transmittance obtained at a wavelength of 730 nm; and
T$_{1650}$: transmittance obtained at a wavelength of 1650 nm
\* "C. Ex." denotes Comparative Example.

All Examples 1-1 to 1-8 contained at least 12% of CaO and had a FeO ratio of at least 27% and a CaO/MgO ratio of at least 30. In all Examples 1-1 to 1-8, T$_{min}$ was at least 1070 nm, while T$_{1650}$ was lower than T$_{730}$.

On the other hand, Comparative Examples 1-1 to 1-5 each contained approximately 8.8% of CaO and had a CaO/MgO ratio of approximately 2.8. In all Comparative Examples 1-1 to 1-5, T$_{min}$ was 1050 nm, while T$_{1650}$ was higher than T$_{730}$.

Comparative Example 1-6 contained 9.2% of CaO. In Comparative Example 1-6, T$_{min}$ was 1060 nm, which was shifted slightly from 1050 nm to the longer wavelength side. However, T$_{1650}$ was higher than T$_{730}$, which was different from the glass compositions of the present invention. Conceivably, this was because the amount of shift in Comparative Example 1-6 was smaller than that in Examples 1-1 to 1-8 and was not sufficient to allow T$_{1650}$ to be lower than T$_{730}$.

FIG. 1 shows the spectral transmittance curves obtained in the single glass sheets (with a thickness of 3.9 mm) of Example 1-3 and Comparative Example 1-2.

Figure 2:
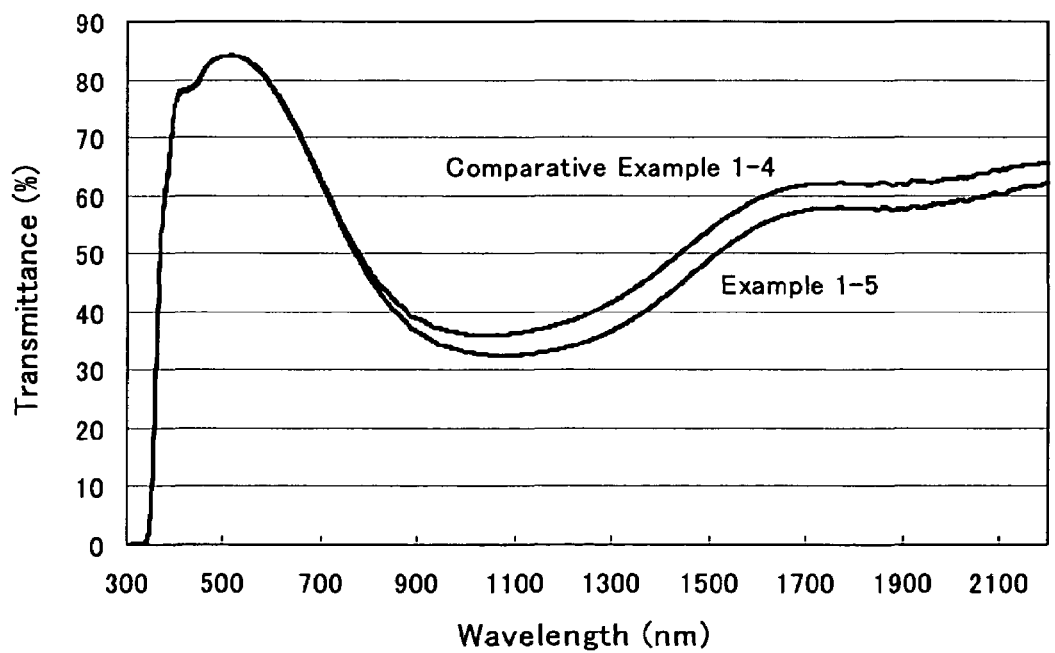
FIG. 2 is a graph showing the spectral transmittance curves of Example Sample 1-5 and Comparative Example Sample 1-4 that were measured in Examples.

FIG. 2 shows the spectral transmittance curves obtained in the single glass sheets (with a thickness of 2.1 mm) of Example 1-5 and Comparative Example 1-4.

As shown in FIGS. 1 and 2, each example had lower transmittance in the wavelength range of approximately 730 nm and longer, particularly, approximately 1100 nm and longer, as compared to each comparative example, respectively.

Next, two glass sheets, each of which had a thickness of 2.1 mm, that were obtained in the above-mentioned manner were bonded to each other with an interlayer film (polyvinyl butyral: PVB) according to a general method for manufacturing laminated glass. Thus, laminated glass was produced. Examples 1-5 to 1-8 correspond to Examples 2-1 to 2-4, while Comparative Examples 1-4 and 1-5 correspond to Comparative Examples 2-1 and 2-2.

Table 3 indicates physical property values that were measured with respect to each laminated glass.

TABLE 3

|  | Ex. 2-1 | Ex. 2-2 | Ex. 2-3 | Ex. 2-4 | C. Ex. 2-1 | C. Ex. 2-2 |
|---|---|---|---|---|---|---|
| $SiO_2$ | 69.5 | 69.2 | 68.7 | 69.1 | 70.0 | 70.0 |
| $Al_2O_3$ | 1.6 | 1.5 | 1.7 | 1.5 | 1.5 | 1.5 |
| $Na_2O$ | 14.2 | 14.2 | 12.3 | 12.3 | 14.3 | 14.3 |
| MgO | 0.4 | 0.4 | 0.4 | 0.4 | 3.2 | 3.2 |
| CaO | 12.1 | 12.5 | 12.3 | 12.0 | 8.8 | 8.8 |
| $K_2O$ | 0.5 | 0.5 | 3.0 | 3.0 | 0.5 | 0.5 |
| $TiO_2$ | 0.05 | 0.05 | 0.05 | 0.05 | 0.05 | 0.05 |
| T-$Fe_2O_3$ | 0.78 | 0.78 | 0.78 | 0.78 | 0.78 | 0.78 |
| $CeO_2$ | 0.88 | 0.88 | 0.88 | 0.88 | 0.88 | 0.88 |
| MnO (mass ppm) | 190 | 190 | 180 | 180 | 180 | 200 |
| CaO/MgO | 30.3 | 31.3 | 30.8 | 30.0 | 2.8 | 2.8 |
| FeO/T-$Fe_2O_3$ (%) | 29.7 | 34.9 | 31.3 | 31.3 | 25.6 | 31.8 |
| Sheet Thickness (mm) | 2.1 + 2.1 | 2.1 + 2.1 | 2.1 + 2.1 | 2.1 + 2.1 | 2.1 + 2.1 | 2.1 + 2.1 |
| $Y_A$ (%) | 71.8 | 70.1 | 71.6 | 71.6 | 72.9 | 70.2 |
| $T_G$ (%) | 44.0 | 40.6 | 42.1 | 42.1 | 45.5 | 42.3 |
| $T_{UV}$ (%) | — | — | — | — | — | — |
| $T_{min}$ (nm) | 1070 | 1075 | 1100 | 1100 | 1050 | 1050 |
| $T_{730}$ (%) | 40.5 | 34.9 | 39.0 | 39.0 | 43.3 | 35.9 |
| $T_{1650}$ (%) | 35.3 | 32.8 | 34.2 | 37.3 | 47.7 | 40.2 |

\* The contents of all the components other than MnO are indicated in mass %.
$Y_A$: visible light transmittance;
$T_G$: total solar energy transmittance;
$T_{UV}$: ultraviolet transmittance;
$T_{min}$: wavelength at which the minimum transmittance was obtained in the range of 550 to 1700 nm;
$T_{730}$: transmittance obtained at a wavelength of 730 nm; and
$T_{1650}$: transmittance obtained at a wavelength of 1650 nm
\* "Ex." denotes Example, while "C. Ex." denotes Comparative Example.

As shown in Table 3, each of Examples 2-1 to 2-4 had a visible light transmittance ($Y_A$) of at least 70%, which satisfied the standard for the visible light transmittance of automobile windshield glass.

Furthermore, in each of Examples 2-1 to 2-4, $T_{min}$ was at least 1070 nm and $T_{1650}$ was lower than $T_{730}$.

On the other hand, in both Comparative Examples 2-1 and 2-2, $T_{min}$ was 1050 nm and $T_{1650}$ was higher than $T_{730}$.

Figure 3:
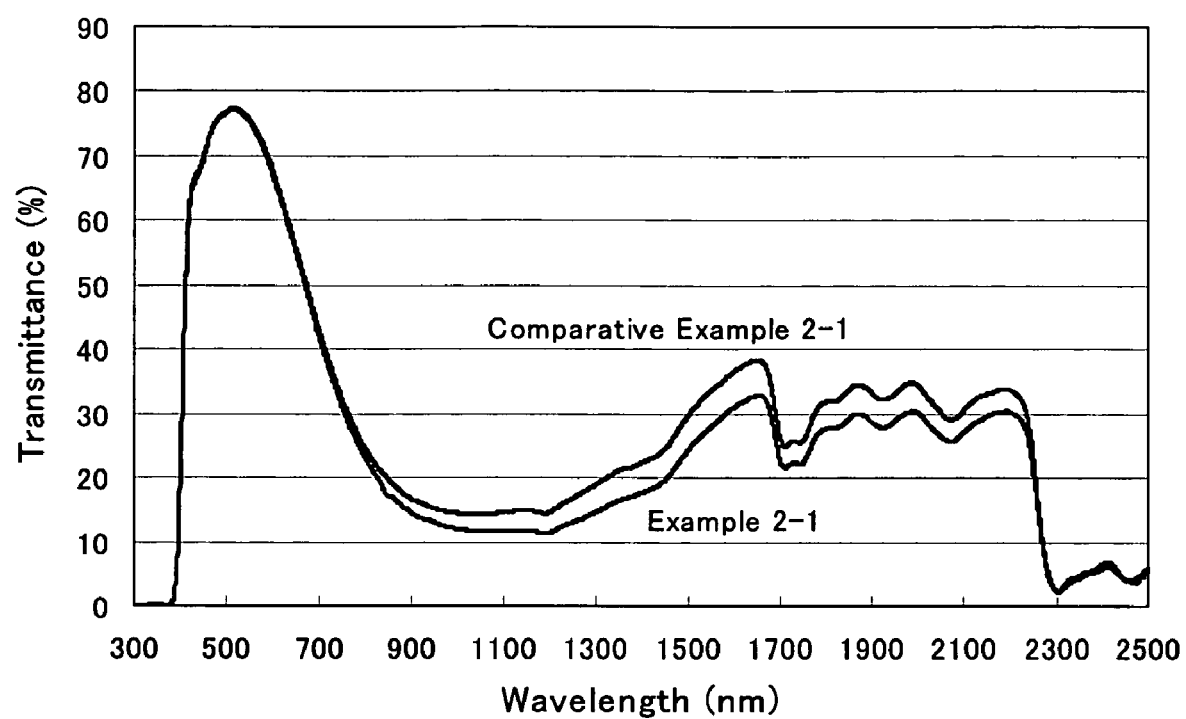
FIG. 3 is a graph showing the spectral transmittance curves of Example Sample 2-1 and Comparative Example Sample 2-1 that were measured in Examples.

FIG. 3 shows the spectral transmittance curves obtained in the laminated glasses (with a thickness of 2.1 mm+2.1 mm) of Example 2-1 and Comparative Example 2-1.

As shown in FIG. 3, Example 2-1 had lower transmittance in the wavelength range of approximately 730 nm and longer, particularly, approximately 1100 nm and longer, as compared to Comparative Example 2-1.

Effect of Reducing Feeling of Heat with Respect to Laminated Glass

The following description is directed to the effect of reducing the feeling of heat that is caused by direct sunlight when the laminated glass formed using the glass composition of the present invention was used for windshield glass for automobiles.

First, an evaluation was made with respect to the relationship between the range in which the human being's skin temperature is raised by incident sunlight and the feeling of heat sensed by the human being's skin. This was carried out by the following procedure.

A filter was attached in the path of a light beam emitted from a xenon lamp (manufactured by SERIC LTD.; XC-500E), and thereby a light source with an energy distribution that is equivalent to that of sunlight was obtained. A panel with a hole whose diameter was 50 mm was placed 416 mm away from the light source. Subsequently, the back of a subject's hand was placed on the opposite side to the light source with respect to the hole and then was irradiated with the light. The temperature of the back of the subject's hand was measured with a thermoviewer every three seconds.

The subject reported the feeling of heat that was sensed due to the light irradiation, in five levels; (1) a little warm, (2) warm, (3) a little hot, (4) hot, and (5) considerably hot. The feeling of heat was determined by integrating the results of experiments that were carried out with respect to 81 subjects.

As a result, it was found out that there was a proportional relationship between the quantity by which the skin temperature was raised due to the light irradiation and the feeling of heat that was sensed actually by human beings, and the feeling of heat increased by one level for every increment of about 0.5° C. to 0.7° C. of the skin temperature. Furthermore, it also was proved that when the quantity by which the skin temperature was raised was set at 3.2° C. or lower with respect to the skin temperature measured before the irradiation, people did not have a feeling of "(5) considerably hot".

Each laminated glass of Example 2-1 and Comparative Example 2-1 was disposed in the hole of the above-mentioned panel. Then the quantity by which the temperature of human being's skin was raised due to the irradiation light was evaluated by the above-mentioned method. As a result, in the case of the laminated glass of Example 2-1, the quantity by which the skin temperature was raised after five minutes from the start of irradiation was about 3.2° C., which was at the level in which people did not have a feeling of "(5) considerably hot". On the other hand, in the case of the laminated glass of Comparative Example 2-1, the quantity was about 3.6° C., which was at the level in which people did have a feeling of "(5) considerably hot" or in the higher level.

Furthermore, the same evaluation was made with respect to the laminated glass (corresponding to Example 3 of Reference 8) including an interlayer film that contained ITO fine particles dispersed therein, which is disclosed in Reference 8 described above. As a result, the quantity by which the skin temperature was raised was higher than that of the laminated glass of Example 2-1 by approximately 0.2° C. Thus it was proved that the laminated glass of the present invention was able to provide a greater effect of reducing the feeling of heat as compared to the laminated glass including an interlayer film that contained ITO fine particles dispersed therein.

As described above, the present invention can provide an infrared absorbent green glass composition that has improved infrared absorptivity while preventing the visible light transmittance from decreasing excessively. Such a glass composition makes it possible to obtain a glass sheet and laminated glass that allow the feeling of heat, which is sensed by the human being's skin due to the sunlight that has passed through them, to be reduced, for example. Such a glass sheet and laminated glass can be used for various uses and are suitable particularly for glass for vehicles such as windshield glass for automobiles, etc.

The invention may be embodied in other forms without departing from the purposes and essential characteristics thereof. The embodiments disclosed in this specification are to be considered in all respects as illustrative and not limiting. The scope of the present invention is indicated by the appended claims rather than by the foregoing description, and all changes which come within the meaning and range of equivalency of the claims are intended to be embraced therein.

What is claimed is:

1. An infrared absorbent green glass composition, comprising:
the following components, expressed in mass %:
$65<SiO_2\leq75$;
$0\leq B_2O_3\leq5$;
$0\leq Al_2O_3\leq5$;
$0<MgO\leq1.5$
$10<CaO\leq15$;
$0\leq SrO\leq10$;
$0\leq BaO\leq10$;
$0\leq Li_2O\leq5$;
$10\leq Na_2O\leq15$;
$0\leq K_2O\leq5$;
$0\leq TiO_2\leq0.5$;
wherein $10<MgO+CaO+SrO+BaO\leq20$ and $10\leq Na_2O+K_2O\leq17.5$,
and
a mass ratio of CaO to MgO (CaO/MgO) is at least 7.5;
the following component, expressed in mass ppm:
MnO 0 to 300 ppm;
the following components as colorants, expressed in mass %:
$0.4\leq T-Fe_2O_3\leq1.0$,
where $T-Fe_2O_3$ is total iron oxide expressed as $Fe_2O_3$,
wherein a mass ratio of FeO expressed as $Fe_2O_3$ to $T-Fe_2O_3$ ($FeO/T-Fe_2O_3$) is 20 to 44%; and
$0\leq CeO_2<2.0$,
wherein a wavelength at which a minimum transmittance is obtained in a range of 550 to 1700 nm is at least 1065 nm, and
a transmittance that is obtained at a wavelength of 1650 nm is not higher than a transmittance that is obtained at a wavelength of 730 nm.

2. The infrared absorbent green glass composition according to claim 1, wherein the mass ratio (CaO/MgO) is at least 30.

3. The infrared absorbent green glass composition according to claim 1, wherein the range of MgO, expressed in mass %, is:
$0<MgO\leq0.75$.

4. The infrared absorbent green glass composition according to claim 1, wherein the range of CaO, expressed in mass %, is:
$11\leq CaO\leq15$.

5. The infrared absorbent green glass composition according to claim 1, wherein the range of $SiO_2$, expressed in mass %, is:
$66.5\leq SiO_2<69$.

6. The infrared absorbent green glass composition according to claim 1, wherein the ranges of $Na_2O$ and $Na_2O+K_2O$, expressed in mass %, are:
$10\leq Na_2O<14.5$; and
$11.5\leq Na_2O+K_2O\leq15$.

7. The infrared absorbent green glass composition according to claim 1, wherein the range of $T-Fe_2O_3$, expressed in mass %, is:
$0.65<T-Fe_2O_3\leq1.0$.

8. The infrared absorbent green glass composition according to claim 1, wherein the range of $CeO_2$, expressed in mass %, is:
$0.1\leq CeO_2\leq1.5$.

9. The infrared absorbent green glass composition according to claim 8, wherein the range of $CeO_2$, expressed in mass %, is:
$0.1\leq CeO_2\leq1.0$.

10. The infrared absorbent green glass composition according to claim 1, comprising MnO.

11. The infrared absorbent green glass composition according to claim 1, wherein the infrared absorbent green glass composition is formed into a sheet shape with a thickness of at least 1.3 mm but less than 2.5 mm, and
the infrared absorbent green glass composition has a visible light transmittance ($Y_A$) of at least 80%, which is measured with the illuminant A, and a total solar energy transmittance ($T_G$) of 62% or lower.

12. The infrared absorbent green glass composition according to claim 1, wherein the infrared absorbent green glass composition is formed into a sheet shape with a thickness between 2.5 mm and 6 mm, and
the infrared absorbent green glass composition has a visible light transmittance ($Y_A$) of at least 70%, which is measured with the illuminant A, a total solar energy transmittance ($T_G$) of 55% or lower, and an ultraviolet transmittance ($T_{UV}$) of 15% or lower.

13. A laminated glass, comprising at least two glass sheets that are bonded to each other, with a thermoplastic resin layer being interposed therebetween,
wherein at least one selected from the at least two glass sheets is formed of an infrared absorbent green glass composition according to claim 1.

14. The laminated glass according to claim 13, wherein the at least two glass sheets are formed of an infrared absorbent green glass composition according to claim 1.

15. The laminated glass according to claim 13, wherein the laminated glass has a visible light transmittance ($Y_A$) of at least 70%, which is measured with the illuminant A, and a total solar energy transmittance ($T_G$) of 45% or lower.

16. The infrared absorbent green glass composition according to claim 4, wherein the range of CaO, expressed in mass %, is:
$12\leq CaO\leq15$.

* * * * *